No. 894,784. PATENTED JULY 28, 1908.
S. VIVIAN, DEC'D.
S. VIVIAN, ADMINISTRATRIX.
LIQUID FLOW CONTROLLER.
APPLICATION FILED SEPT. 25, 1906.
2 SHEETS—SHEET 1.
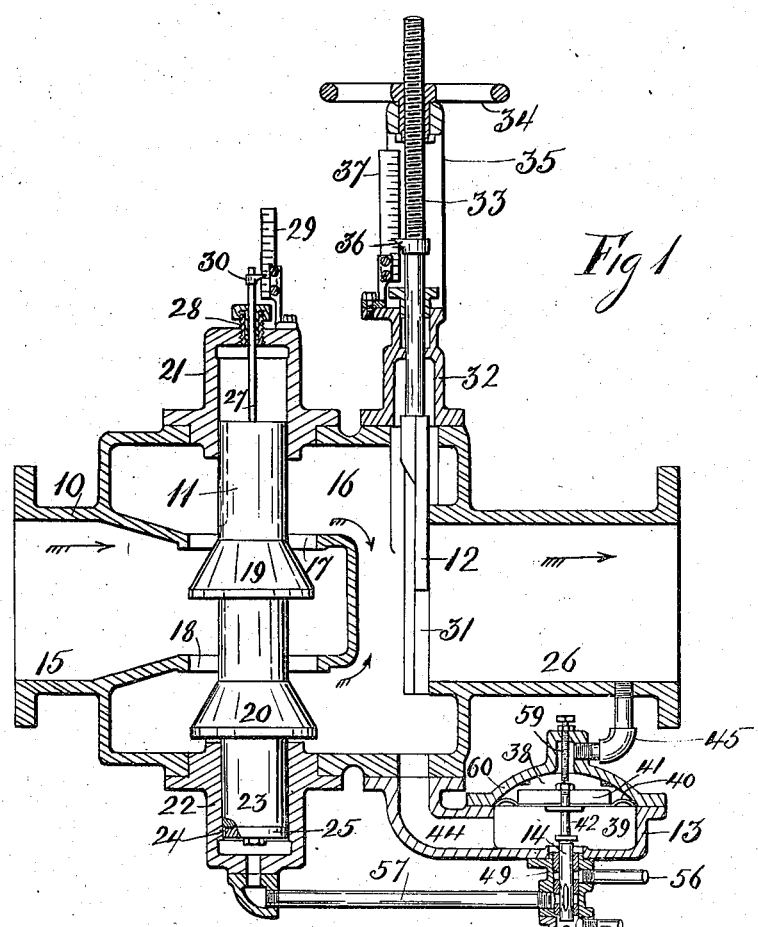
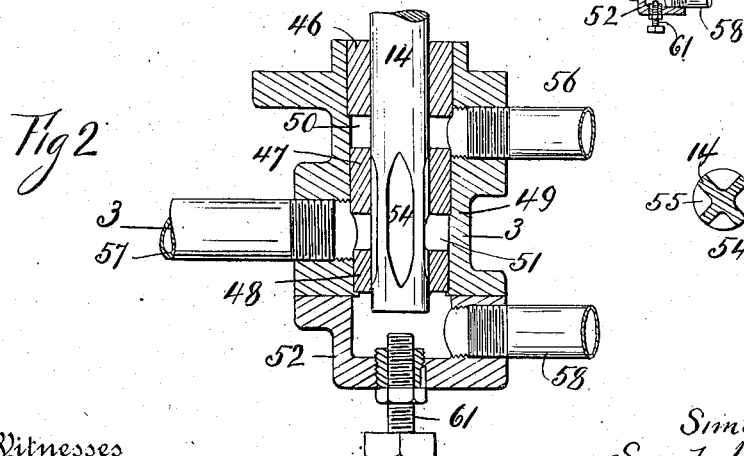
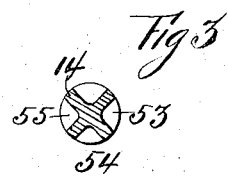

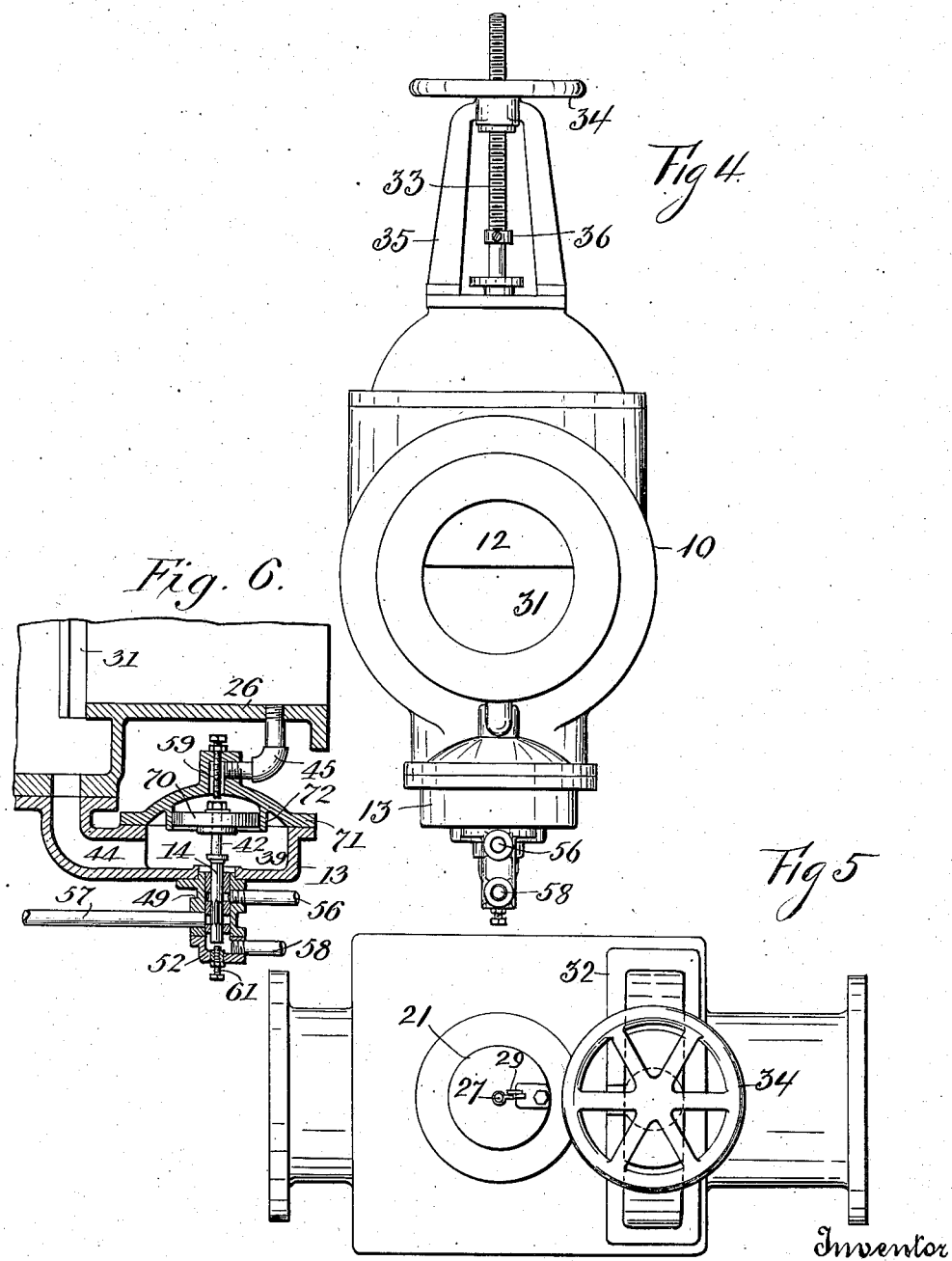

UNITED STATES PATENT OFFICE.

SARAH VIVIAN, OF CINCINNATI, OHIO, ADMINISTRATRIX OF SIMON VIVIAN, DECEASED.

LIQUID-FLOW CONTROLLER.

No. 894,784.  Specification of Letters Patent.  Patented July 28, 1908.

Application filed September 25, 1906. Serial No. 336,129.

*To all whom it may concern:*

Be it known that SIMON VIVIAN, late a citizen of the United States, and a resident of Cincinnati, in the county of Hamilton, State of Ohio, but now deceased, did invent a certain new and useful Improvement in Liquid-Flow Controllers, of which the following is a specification.

This invention relates to an improvement in apparatus for automatically controlling the rate of flow of a fluid, a liquid, and the like from one reservoir to another, in which latter the fluid or liquid is under a lower head or pressure than in the first. The head of liquid in either reservoir may fluctuate or remain constant.

The primary object of the invention is to produce an automatic fluid flow controller, to control automatically the rate of flow of a fluid through an orifice, and maintain constant the difference of head caused by the orifice.

The essential elements of the invention comprise a valve for an orifice through which the fluid flows, in conjunction with a throttling valve, which latter co-acts with an auxiliary controlling valve device. The operations of the controlling and throttling valve, depend upon the heads or pressures of the fluid, on the opposite sides of the orifice through which the fluid flows.

In the accompanying drawings, Figure 1 exemplifies a partial vertical axial section of the invention, Fig. 2 shows a portion of Fig. 1 enlarged, Fig. 3 is a partial section of Fig. 2 on the line 3, 3, Fig. 4 is a right hand side view of Fig. 1, Fig. 5 represents a top plan view of Fig. 1, and Fig. 6 shows a partial section similar to Fig. 1 with a modification.

The essential elements of the invention as shown in the drawing comprise the valve body or casing 10, plunger throttling valve 11, sliding gate valve 12, auxiliary chamber 13, and the controlling valve 14. The valve body or casing 10 contains the inlet chamber 15, intermediate chamber 16 and outlet chamber 26.

The chambers 15 and 16 are connected by the ports 17 and 18. The plunger throttling valve 11 has formed therewith the tapering portions 19 and 20. A cylinder 21 serves as a guide for the upper end of the valve 11, and a cylinder 22 serves as a guide for the lower end 23 of said valve. The said lower end of the valve 11 performs the functions of a piston, and is provided with the cup leather packing ring 24 and follower ring 25. The upper end of the valve 11 carries the pointer rod 27, that passes through a stuffing box 28 supported on the cylinder 21. A scale 29 extends from the cylinder 21 and engages with the pointer 30 carried on the rod 27. The intermediate chamber 16 and outlet chamber 26 are separated by the gate valve 12. The latter controls the area of the orifice 31 leading into the outlet chamber. The gate valve enters the intermediate chamber 16 and at its upper end is inclosed by the valve bonnet 32. The valve stem 33 of the valve 12 is threaded and engages with the threaded hand wheel 34, which latter is supported on the valve yoke 35. The valve rod carries a pointer 36, that engages with a scale 37 extending from the bonnet 32. The auxiliary chamber 13 is divided into the upper compartment 38 and lower compartment 39 by means of the diaphragm 40, which latter carries the counter-weight 41. From the said diaphragm extends the valve rod 42, and to the latter is attached the controlling D valve 14. The compartment 39 is connected with the intermediate chamber 16 by means of the conduit 44, and the compartment 38 is connected with the outlet chamber 26 by means of the conduit 45.

The D valve 14 slides on the annular seats 46, 47 and 48 that are secured in the valve chamber 49. Between the said annular seats are formed the annular ports 50 and 51, and a bonnet 52 is fastened to the lower end of the valve chamber 49. Ports 53, 54 and 55 are formed in the valve 14. A conduit 56 leads from a source of hydraulic pressure into the port 50, a conduit 57 connects the port 51 with the lower end of the cylinder 22 under the piston end 23 of the throttling plunger valve 11, and a drain conduit 58 connects with the bonnet 52. An adjustable bolt 59 is secured in the bonnet 60 of the auxiliary chamber 13, and an adjustable bolt 61 is secured in the bonnet 52.

To use the invention it will be noted that a fluid, or liquid enters and flows through the apparatus in the directions of the arrows, passes through the ports 17, 18 and then through the orifice 31, into the outlet chamber 26. For any predetermined rate of flow of the liquid from the inlet 15 to the outlet 26, the gate valve 12 is located to obtain the proper area for the orifice 31. By virtue of the liquid flowing through said orifice there is caused a predetermined loss of head or pressure between the intermediate chamber 16 and outlet chamber 26. As the compartment 39 is connected with the chamber 16, and the compartment 38 is connected with the chamber 26, the difference of head or pressure in the compartments 38 and 39, equals the difference of pressures in the chambers 16 and 26. The combined weights of the valve 14, counterweight 41, and their intermediate appurtenances is made equal to this difference of pressure. The compartment 39 has the greater pressure, and the pressure in the compartment 38 with said combined weights maintains the diaphragm 40, in its normal condition of equilibrium, when the proper and predetermined loss of head or pressure is secured for the liquid in the outlet chamber 26. Under these conditions the D valve 14 is suspended in its valve chamber, so that the ports 53, 54 and 55 are closed to all the ports leading to any of the conduits 56, 57 and 58.

If for any reason, such as fluctuations in head in either reservoir, the rate of flow through the controller increases, the area of the orifice 31 remaining the same, then the difference of pressures in the intermediate chamber 16 and the outlet 26, and consequently in compartments 38 and 39 increases, thereby raising the diaphragm 40 and the D valve 14. In this raised position, the ports of the D valve connect the pressure conduit 56 with the conduit 57 leading to the under side of the piston end 23 of the plunger valve 11, thereby raising the latter and partially closing the ports 17 and 18. By the partial closing of the ports 17 and 18 the rate of flow of the liquid is gradually reduced, until the difference of pressures in the chambers 16 and 26 is such as to again maintain equilibrium in the auxiliary chamber, when the ports of D valve will again be closed to the conduits 56, 57 and 58. If the rate of flow through the controller decreases, then the difference of pressures in the intermediate chamber 16 and outlet chamber 26, and consequently in the compartments 38 and 39 decreases, thereby lowering the diaphragm 40 and the D valve 14. In this lowered position the ports of the D valve connect the conduit 57 with the drain 58. Then the pressure under the piston end 23 of the plunger valve 11 is reduced, and the plunger falls by gravity, thereby gradually increasing the areas of the ports 17 and 18, by virtue of which the rate of flow is increased, until the difference of pressures in the chambers 16 and 26 again maintains the D valve in its normal position of equilibrium.

In Fig. 6 the auxiliary chamber 13 is shown provided with a piston 70 instead of the diaphragm 40 and its counterweight 41. The piston 70 is secured to the valve rod 42, and a bonnet 71 for said chamber 13 has formed therewith the barrel 72 for the piston 70.

Having described the invention there is claimed:

1. The combination in a fluid flow controller of a casing having an inlet chamber, an intermediate chamber and an outlet chamber, an adjustable valve controlling the area of the entrance to said outlet chamber, a throttling valve between the inlet chamber and the intermediate chamber, a controlling valve actuated by the differences of pressures in the outlet chamber and intermediate chamber, a valve chamber for the latter valve, a conduit for a source of hydraulic pressure connected to the latter valve chamber, a conduit leading from the latter chamber to the under side of the throttling valve, and means to drain said latter valve chamber.

2. In an apparatus the combination of a casing having an inlet chamber, an intermediate chamber and an outlet chamber, an adjustable valve controlling the entrance to the outlet chamber, a throttling valve in the path of the fluid between the inlet chamber and the intermediate chamber, an auxiliary chamber connected up with the apparatus, a diaphragm in the auxiliary chamber, a controlling valve having ports in connection with the diaphragm, a valve chamber for the controlling valve, a piston end connected to the throttling valve, a cylinder for said piston end, a conduit connecting the valve chamber of the controlling valve with the space under the piston of the throttling valve, a conduit for hydraulic pressure connected to the chamber of the controlling valve, and a drain pipe leading from the latter chamber, the ports in the controlling valve chamber located, so that they are all covered by the controlling valve when the latter is maintained in its normal position, and that the hydraulic pressure is communicated to the piston end of the throttling valve in one position of the controlling valve, and that the drain pipe connects with said piston end of the throttling valve in another position of the controlling valve.

3. The combination in an apparatus for automatically controlling the rate of flow of a liquid, of a casing having an inlet chamber, an intermediate chamber and an outlet chamber, an adjustable valve at the entrance to the outlet chamber, an auxiliary chamber, a diaphragm in the auxiliary chamber dividing the latter into two compartments, one of the compartments in connection with the outlet chamber, and the other in connection with the intermediate chamber, a controlling valve connected to the diaphragm, a valve chamber for the latter valve, a source of pressure connected with the latter chamber, and a conduit extending from the latter chamber to bring pressure under the throttling valve.

4. The combination in an apparatus for automatically controlling the rate of flow of a liquid, of a casing having an inlet chamber, an intermediate chamber and an outlet chamber, an adjustable valve for the entrance to the outlet chamber, an auxiliary chamber connected with the apparatus, a movable element dividing the auxiliary chamber into two compartments, one of said compartments in connection with the fluid after passing through the orifice leading to the outlet chamber, and the other compartment in connection with the fluid before passing through said orifice, a counterweight controlling valve controlled by the said movable element, a valve chamber for the latter valve, a source of pressure connected with the latter chamber, and a conduit extending from said chamber to bring said pressure under the throttling valve.

5. The combination in an apparatus for automatically controlling the rate of flow of a liquid, of a casing having an inlet chamber, an intermediate chamber and an outlet chamber, an adjustable valve at the entrance to the outlet chamber, an auxiliary chamber, a diaphragm dividing the auxiliary chamber into two compartments, one of said compartments in connection with the outlet chamber, and the other compartment in connection with the intermediate chamber, a controlling valve having ports connected to the diaphragm, a counterweight on the diaphragm to counterbalance the difference of pressures on the opposite sides of the diaphragm, a valve chamber for the controlling valve, a throttling valve between the inlet chamber and the intermediate chamber, a piston end for the throttling valve, a cylinder for said piston end, a conduit connecting the piston end and the valve chamber of the controlling valve, a drain conduit leading from the latter chamber, and a conduit for hydraulic pressure connected to the latter valve chamber.

Signed at Cincinnati in the county of Hamilton, State of Ohio, this 21st day of September 1906.

SARAH VIVIAN,
*Administratrix of the estate of Simon Vivian, deceased.*

Witnesses:
CHAS. R. HOWELL,
JOSEPH W. ELLMS.